LINE ADAPTER FOR DATA COMMUNICATION SYSTEM

Filed Aug. 30, 1968 11 Sheets-Sheet 1

INVENTORS.
ROBERT LOUIS RAWLINGS
LOTHAR OSCAR SCHWEIGL

BY Christie, Parker & Hale
ATTORNEYS.

LINE ADAPTER FOR DATA COMMUNICATION SYSTEM

| | | | | | CONTROL | | TEXT | | | | CONTROL | |
|---|---|---|---|---|---|---|---|---|---|---|---|---|
| BITS 7 | | | | | 0 | 0 | 0 | 0 | 1 | 1 | 1 | 1 |
| 6 | | | | | 0 | 0 | 0 | 1 | 1 | 0 | 1 | 1 |
| 5 | | | | | 0 | 1 | 0 | 1 | 0 | 1 | 0 | 1 |
| 4 | 3 | 2 | 1 | ROW \ COLUMN | 0 | 1 | 2 | 3 | 4 | 5 | 6 | 7 |
| 0 | 0 | 0 | 0 | 0 | NUL | DLE | SP | 0 | @ | P | | POL |
| 0 | 0 | 0 | 1 | 1 | SOH | DC1 | ! | 1 | A | Q | | SEL |
| 0 | 0 | 1 | 0 | 2 | STX | DC2 | " | 2 | B | R | | SEQ |
| 0 | 0 | 1 | 1 | 3 | ETX | DC3 | £ | 3 | C | S | | FSL |
| 0 | 1 | 0 | 0 | 4 | EOT | DC4 | $ | 4 | D | T | | BRD |
| 0 | 1 | 0 | 1 | 5 | ENQ | NAK | % | 5 | E | U | | GSL |
| 0 | 1 | 1 | 0 | 6 | ACK | | & | 6 | F | V | | |
| 0 | 1 | 1 | 1 | 7 | BEL | ETB | ' | 7 | G | W | | |
| 1 | 0 | 0 | 0 | 8 | BS | | ( | 8 | H | X | | REQ |
| 1 | 0 | 0 | 1 | 9 | HT | | ) | 9 | I | Y | | |
| 1 | 0 | 1 | 0 | 10 | LF | | * | : | J | Z | | |
| 1 | 0 | 1 | 1 | 11 | VT | | + | ; | K | [ | | |
| 1 | 1 | 0 | 0 | 12 | FF | FS | , | < | L | | | |
| 1 | 1 | 0 | 1 | 13 | CR | GS | - | = | M | ] | | |
| 1 | 1 | 1 | 0 | 14 | SO | RS | . | > | N | ∧ ⁝ = | | ~ |
| 1 | 1 | 1 | 1 | 15 | SI | US | | ? | O | UND ⁝ GM | | DEL |

FIG. 5

LINE ADAPTER FOR DATA COMMUNICATION SYSTEM

Filed Aug. 30, 1968

LINE ADAPTER FOR DATA COMMUNICATION SYSTEM

United States Patent Office 3,559,184
Patented Jan. 26, 1971

3,559,184

LINE ADAPTER FOR DATA COMMUNICATION SYSTEM

Robert Louis Rawlings, Diamond Bar, and Lothar Oscar Schweigl, Sierra Madre, Calif., assignors to Burroughs Corporation, Detroit, Mich., a corporation of Michigan

Filed Aug. 30, 1968, Ser. No. 756,618
Int. Cl. G06f *9/18*
U.S. Cl. 340—172.5 9 Claims

ABSTRACT OF THE DISCLOSURE

There is described an adapter for connecting the input-output buffer of a processor to a standard telephone data set for transmission between the processor and a number of remote terminals. The adapter permits automatic polling of a number of remote stations using polling information stored in the input-output buffer by the processor without intervention of the processor. The adapter provides translation between the internal six-bit code of the processing system and a standard ASCII seven-bit code for transmission to or reception from the remote terminals. The adapter is asynchronous in its operation.

In Pat. 3,390,379, assigned to the same assignee as the present invention, there is described a data communication system by which a data processor may communicate with a number of remote terminal units of different types. Specifically, there is described a terminal communication control circuit which acts as a buffer between a processor and a number of remote terminal stations. Each communication link requires a line adapter which controls the transfer of data between the terminal communication control and the communication lines to the various remote stations.

The present invention is directed to an improved line adapter for connecting the data transmission terminal to a standard data set, such as a Western Electric 202 data set.

In brief, the adapter of the present invention is asynchronous in operation for use with standard telephone circuits. The adapter permits the transmission of a number of different polling messages to selected remote stations via the telephone communication link. Each polling message polls a particular remote station to initiate transmission of data from the remote station to the input-output buffer of the central processor. As each polling message is transmitted, the adapter waits to receive a response, and if the response is negative, the adapter causes the next polling message stored in the buffer memory to be sent. If a positive response is received, the adapter causes the received message to overwrite the polling messages in the buffer memory. The adapter provides the necessary code translation to permit use of substantially the full seven-bit ASCII code to be used in the communication link, the adapter providing translation to the internal six-bit code of the processor. The polling messages are recycled automatically until a positive response from a polled station is obtained or until polling is interrupted by an interrogation from the processor.

DESCRIPTION OF THE DRAWINGS

For a better understanding of the invention, reference should be made to the accompanying drawings, wherein:

FIG. 5 shows the code set for use with the remote stations.

DESCRIPTION OF A SPECIFIC EMBODIMENT

Figure 1:
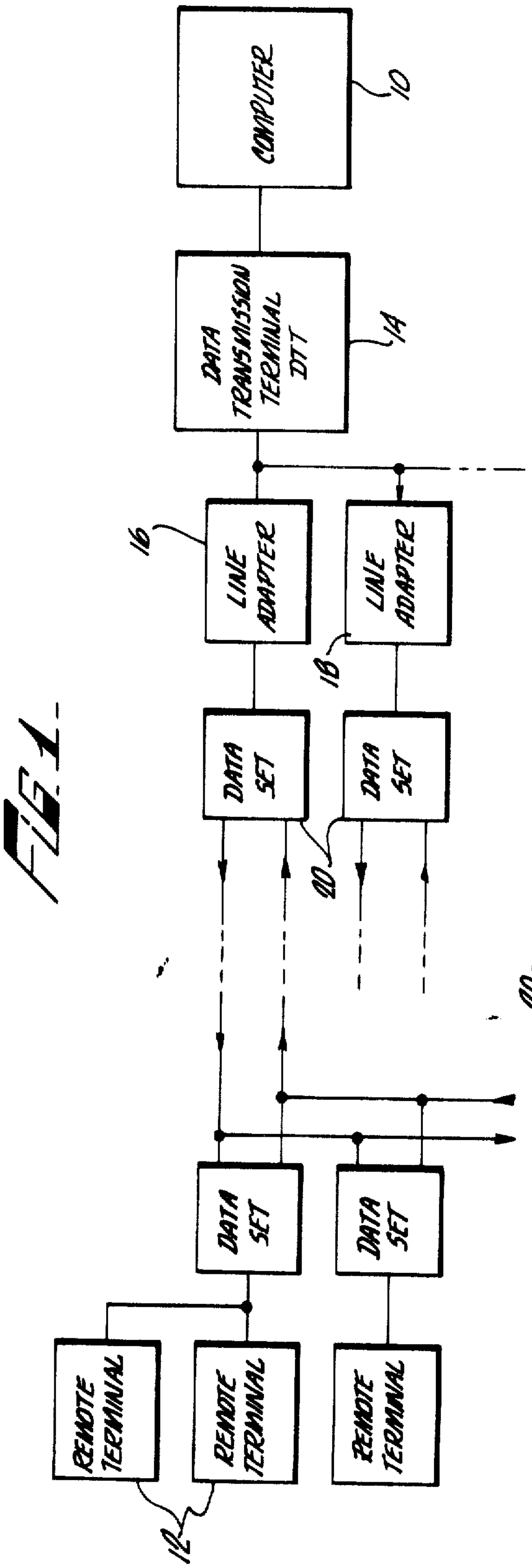
FIG. 1 is a block diagram of the data transmission system to which the present invention is utilized.

The present invention is directed to a line adapter useful in a system such as shown in FIG. 1 for providing data communication between a computer 10, such as the Burroughs B–5500 computer, and a plurality of remote terminal stations, as indicated at 12, which may be the Burroughs TC–500 Data Communication Processor described in copending application, Ser. No. 723,088, filed Apr. 22, 1968. Buffering between the computer 10 and the remote stations is provided by a Data Transmission Terminal unit (DTT) 14 which is described in U.S. Pat. 3,390,379. The line adapters, two of which are indicated at 16 and 18, hereinafter described in detail, provide control of data between the Data Transmission Terminal unit 14 and standard telephone data sets indicated at 20, such as the Western Electric 202. The data set provides serial transmission on standard telephone lines by a modulated carrier at bit rates of 600 to 1800 bits per second.

Figure 3:
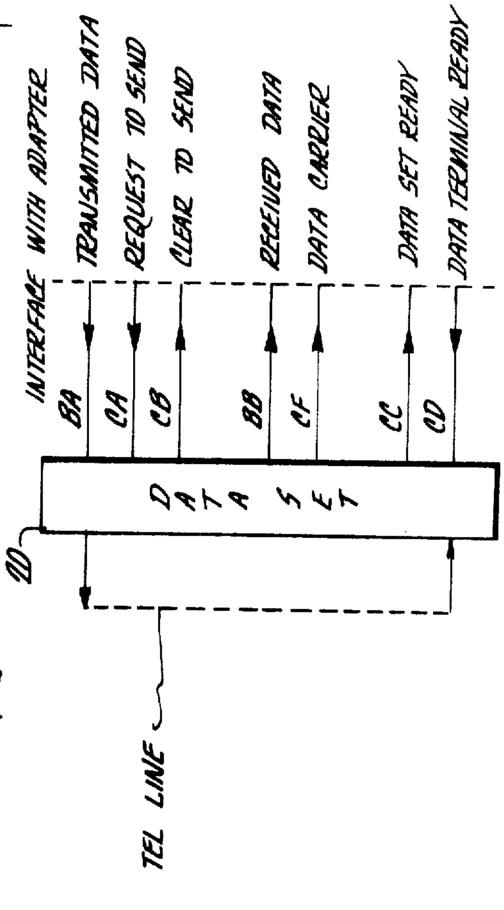
FIG. 3 is a block diagram of the Data Set showing the interface with the adapter.

The interface between the line adapter 16 and the data set 20 is shown in FIG. 3. Binary information is transmitted to the telephone line by switching the level on the BA input line between ±6 volts. Communication with the remote terminal requires that a level be raised on the CD input which places the communication link in a ready condition. When it is desired to transmit data to the line, the level is raised on the CA input indicating to the communication link that there is a request to send data. When the data set is ready to either receive or transmit information, it raises the level on the CC line and it raises the level on the CF line, indicating that the carrier signal is on the line. When the data set is clear to send data, it raises the level on the CB output line. Received binary data changes the level on the BB output line between ±6 volts.

Figure 2:
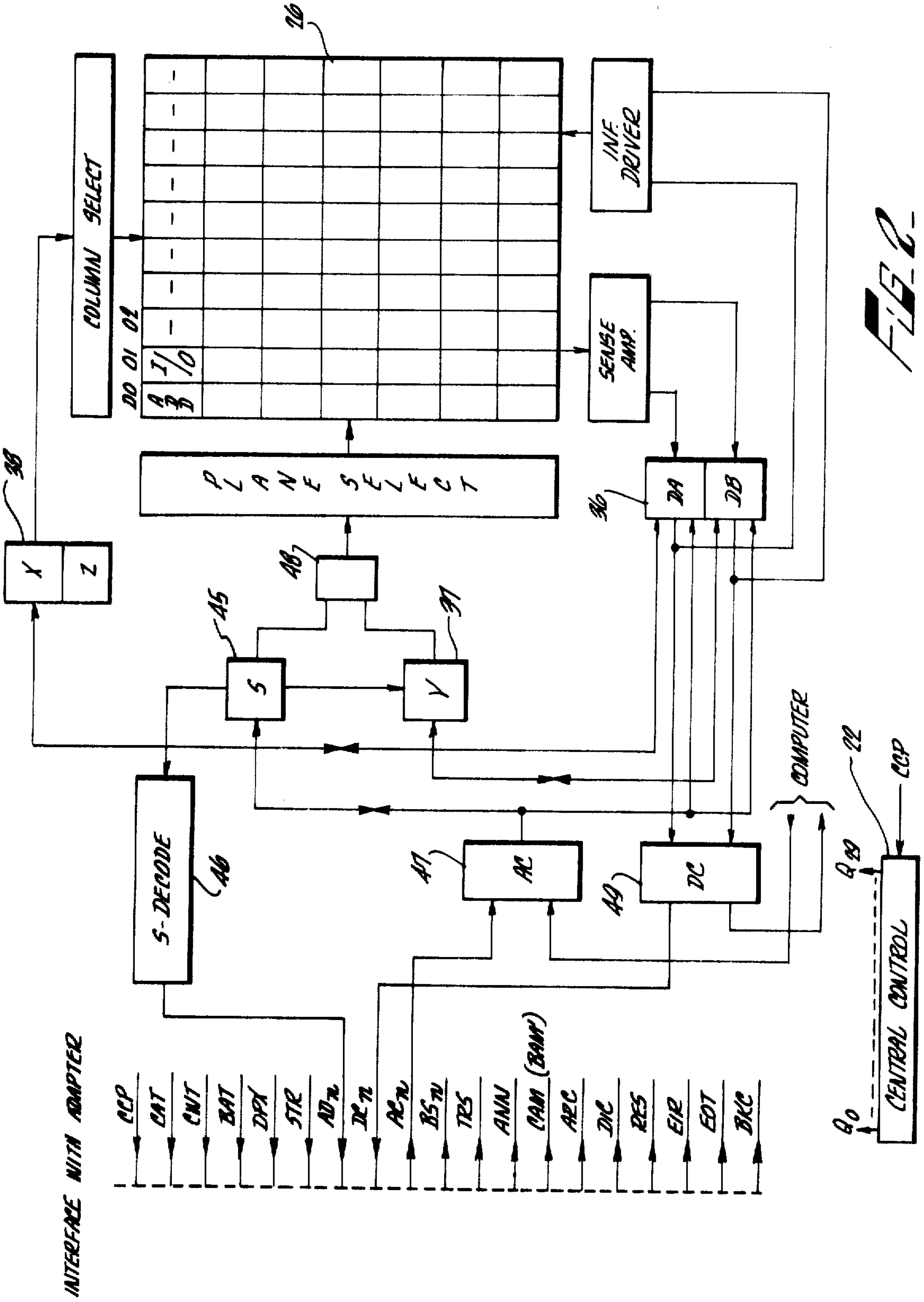
FIG. 2 is a block diagram of the Data Transmission Terminal unit showing the interface with the line adapter.

The interface between the line adapter 18 and the Data Transmission Terminal unit 14 is shown in FIG. 2. While the interface of the Data Transmission Terminal is described in detail in the above-identified patent together with a description of the operation of the unit, a brief review of the significance of a number of these signals and the basic operation of the terminal unit is believed in order to better understand the present invention. The DTT unit 14 includes a buffer memory 26 which is divided into a number of separate addressable planes, indicated as rows in the block diagram. Each plane has its own associated line adapter which is designated by the address in an S-address register 45. This address is decoded by an S-decoder 46 and applied to the interface at the output line designated $AD_n$. The AD line designates which line adapter is to be put into operation. The address designating a memory plane and the associated line adapter is normally received from the processor and placed in an input or AC register 47 which also receives data from the designated line adapter through information input lines designated $AC_n$.

The buffer memory 26 is arranged in a plurality of separately adressable columns starting with address 00. Column addressing is through an X-register 38. The 00 column is used to store the address of the next character location within the buffer which is to be transmitted or in which the last received character has been stored. The address column 01 is used as a temporary input-output storage buffer where a character is placed before it is released for transmission to the communication line or where it is initially received from the data communication line.

All communciation with the memory 26 is through an information register 36 which stores one word of information corresponding to two six-bit characters, the standard character length for the B–5500 computer 10. Data is transferred from the information register 36 either serially or in parallel, a character at a time. Information data in the register 36 is transferred to the line adapter over output lines designated $DC_n$, the $DC_8$ line being used for serial transmission. Operation of the DTT unit 14 is by a central control circuit 22 which is synchronized from a clock source which generates control clock pulses (CCP) at clock rates at, for example, 10 microseconds.

In the course of transmitting or receiving data, the DTT unit 14 provides a number of control signals to the line adapter 16 including the clock pulses CCP, a start level STR, and the adapter designation address on lines $AD_n$.

Other signals at the interface include the output line CAT. This is a 20-microsecond pulse normally generated by the DTT unit 14 when a full character is stored in the information register 36 and is available for access by the adapter. The output line CWT is a 10-microsecond pulse indicating the second half of the CAT time. The output line BAT is a 10-microsecond pulse indicating bit access time to the adapted. Single bit transfer between the information register 36 and the adapter is over the $AC_8$ and the $DC_8$ lines at BAT time.

In addition, the DTT unit 14 receives a number of control signals from the line adapter. The manner in which these signals are generated will hereinafter be described in more detail. The TRS input line provides a signal indicating that the line adapter is in either the transmit state or in the receive state. The ANN input line indicates that the adapter needs attention, and the $BS_n$ lines identify which buffer needs attention. The CAM input provides a level indicating that the adapter wants to transfer a character in parallel to the information register 36. The ARC input indicates that a character is to be replaced in the buffer, while the DIC input indicates that a character is to be discarded. The RES line is a reset signal input. The EIR line signals that the buffer recognizes the end of an input, while the EOT line signals the end of transmission. The BKC line provides a "back-space" operation which is used during transmission to increment the column select address in the register 38 while discarding the previous character.

The B–5500 computer uses six-bit characters, permitting 64 different characters, whereas the data transmission terminal operates on a seven-bit code known as ASCII. The code set for the adapter using the ASCII code is set forth in FIG. 5. It will be noted that the seven-bit code in which the characters are received or transmitted by the line adapter have four columns in which the sixth and seventh bits are equal. These characters are referred to as the control state characters. In the remaining four columns, the sixth and seventh bits are unequal. These characters are referred to as the text state characters. The internal six-bit code set for the B–5500 computer corresponds to columns 2, 3, 4, and 5 except that the Circumflex (^) character of ASCII is an Unequal ($\neq$) character in the six-bit code while the Underline (——) character is a Group Mark ($\leftarrow$) character in the six-bit code.

The adapter has a flip-flop which determines whether the adapter is in the control state or in the text state. A change of state is signaled by the presence of a $\neq$ character (011110) during transmit. During receive, a change of state is signaled by the sixth and seventh bits of a character being equal when the adapter is in the text state and being unequal when the adapter is in the control state. In the control state, any six-bit character in columns 4 and 5 (FIG. 5) is changed to the character in the same row of columns 6 and 7, while the character in column 2 and 3 map to the characters in columns 0 and 1. This is accomplished by always complementing the sixth bit and making the seventh bit equal to the sixth bit when transmitting, or complementing the sixth bit and stripping off the seventh bit when receiving. Since the $\neq$ character (011110) in the internal six-bit code maps to the Tilde ($\sim$) character in the ASCII code, the $\sim$ character cannot be transmitted and is discarded if received. Also the Group Mark (011111) is used in the adapter to signal a control condition and so the corresponding ASCII code characters —— and Delete (DEL) are not transmitted and are discarded if received. Special provision is made to transmit and receive the Circumflex character by translating it to a pair of $\neq$ characters.

Figure 4:
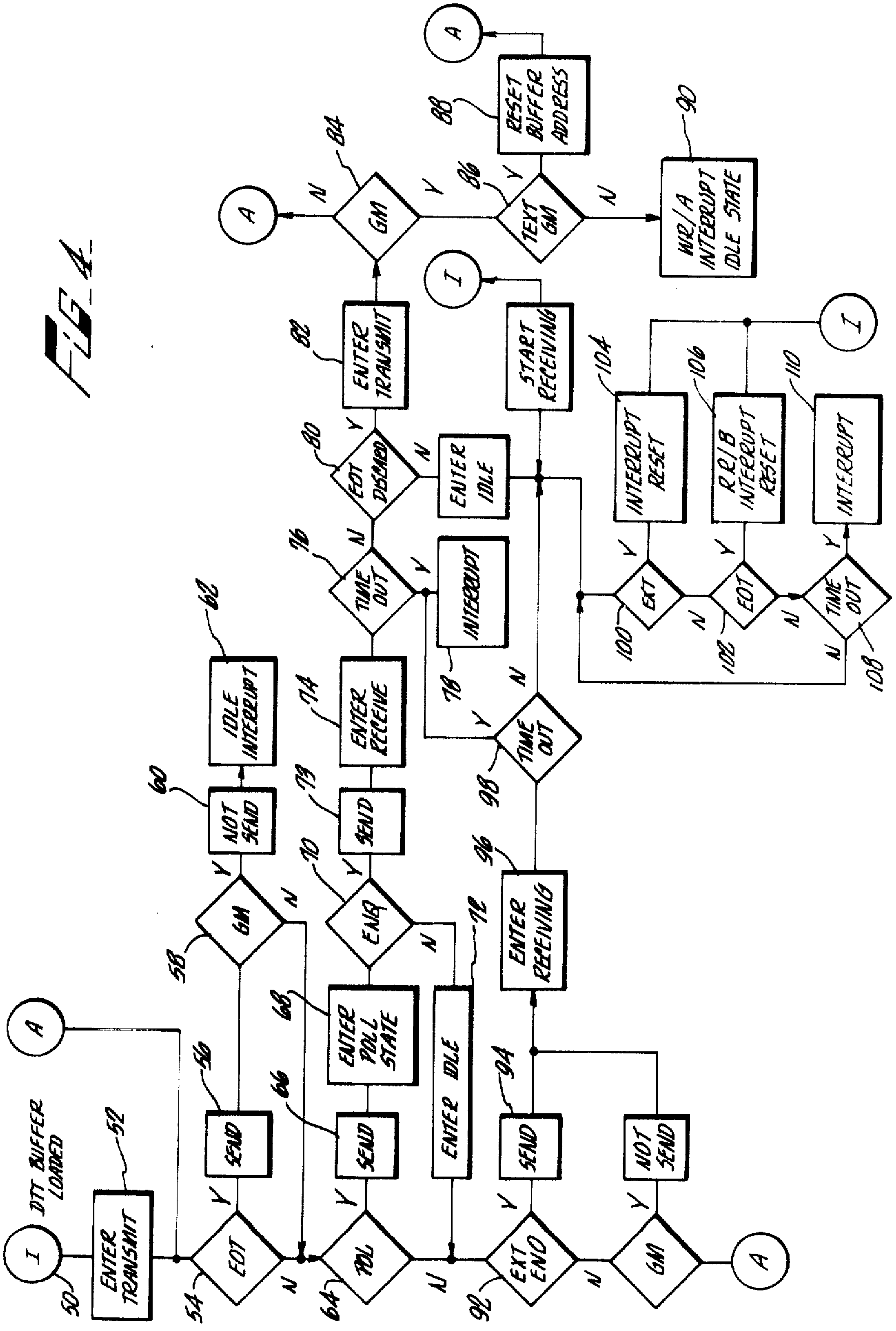
FIG. 4 is a diagram summarizing the operation of the line adapter.

Before considering the operation of the adapter circuit in detail, an overall summary of the operation of the adapter under various operating conditions can best be understood by reference to FIG. 4 which shows an operational chart of the adapter. Initially, the adapter is in an idle condition, represented by I at 50. When the DTT buffer is loaded, the DTT unit 14 sends over an STR signal to the designated line adapter 16. This causes the line adapter to enter the transmit mode as indicated at 52. The line adapter then examines the character on the $DC_n$ lines from the information register 36 to determine what character is present. If the DTT unit is arranged to poll a number of remote stations over a common telephone line through the selected or designated adapter, the buffer memory at this time will be loaded with a sequence of polling messages.

The series of polling messages stored in the buffer memory each consists of an EOT character followed by two address characters, a POL character, and an ENQ character. The EOT character insures that the adapter is cleared and in the idle state. The two address characters identify the remote station being polled and set the particular remote station to receive the POL character. The ENQ character signals a remote station that a response is required. Thus, the polling message operates to seek data from a selected remote station.

Returning to the operation summary of FIG. 4, after entering the transmit state, the adapted looks at the first character placed in the information register 36 by the DTT unit. If this is an EOT character, as indicated at 54, the character is sent to the remote station, as indicated at 56. Remembering that an EOT is being sent, the adapter looks at the next character in the buffer to determine whether or not it is a Group Mark, as indicated at 58. The Group Mark (011111), if present in the buffer, is not transmitted, as indicated at 60, and the system is placed in an idle-interrupt condition 62. Thus, the Group Mark following an EOT is used to interrupt a transmission.

When polling, the next two characters after the EOT in the polling message from the buffer are address characters. These two address characters are transmitted in the normal manner, alerting the selected remote station. If a POL character is next encountered in the buffer following the two address characters, as indicated at 64 in FIG. 4, the POL character is sent to the remote station, as indicated at 66, and the line adapter enters a poll state of operation, as indicated at 68. The adapter now looks for the ENQ character signaling the end of the poll message. If the ENQ character is not sensed in the buffer at this time, as indicated at 70, the line adapter is returned to the idle state, as indicated at 72.

Assuming that the next character is an ENQ, it is sent to the remote station, as indicated at 73, and the adapter enters a receive state, as indicated at 74. The line adapter now waits for a response from the remote station. A two-second timer is set, as indicated at 76. If this timer times out before any response is received back from the remote station, a special Interrupt is sent by the adapter to the system, as indicated at 78.

Normally, the remote station will come back either with an EOT character, indicating a negative response to the poll, or it will come back with a message. If it comes back with an EOT character, as indicated at 80, the character is discarded and not stored in the buffer and the adapter returns to the transmit condition, as indicated at 82. Operation then continues with the transmission of the next polling message in the buffer unless the next character encountered in the buffer is a Group Mark, as indicated at 84. If it is a Group Mark, it is tested to see whether it is a text Group Mark or a control mark, as indicated at 86. If it is a text Group Mark, the Group Mark is preceded by a ≠ character to flag a change to the text state of the adapter. The buffer address in the DTT unit is then reset, and the polling is repeated. If it is a control Group Mark, a special Interrupt is sent to the system and the line adapter is returned to the idle state.

Other special characters which may be sensed during the transmit condition are the ETX character, signaling the end of a text, the ENQ character, which is used to signal the end of a selection message as well as a poll message, or the Group Mark character. If either the ETX or ENQ character is sensed by the adapter, as indicated at 92, it is sent to the remote station, as indicated at 94, and the line adapter enters the receive condition, as indicated at 96. The Group Mark also causes the adapter to enter the receive state but it is not sent to the remote station.

Again the timer is set, and, if nothing is received within two seconds, the Interrupt is set. Otherwise the line adapter begins to receive characters from the remote station. These are loaded into the buffer until either an ETX or an EOT character is encountered, as indicated at 100 and 102. The ETX character, when sensed by the line adapter, results in an Interrupt condition and a reset signal being sent to the DTT unit, as indicated at 104. If an EOT character is sensed, a different Interrupt and a reset are sent to the DTT unit, as indicated at 106. The line adapter then returns to the idle state. If no character is received, the timer circuit will time out, as indicated at 108, and an Interrupt is also set, as indicated at 110.

Figure 6:
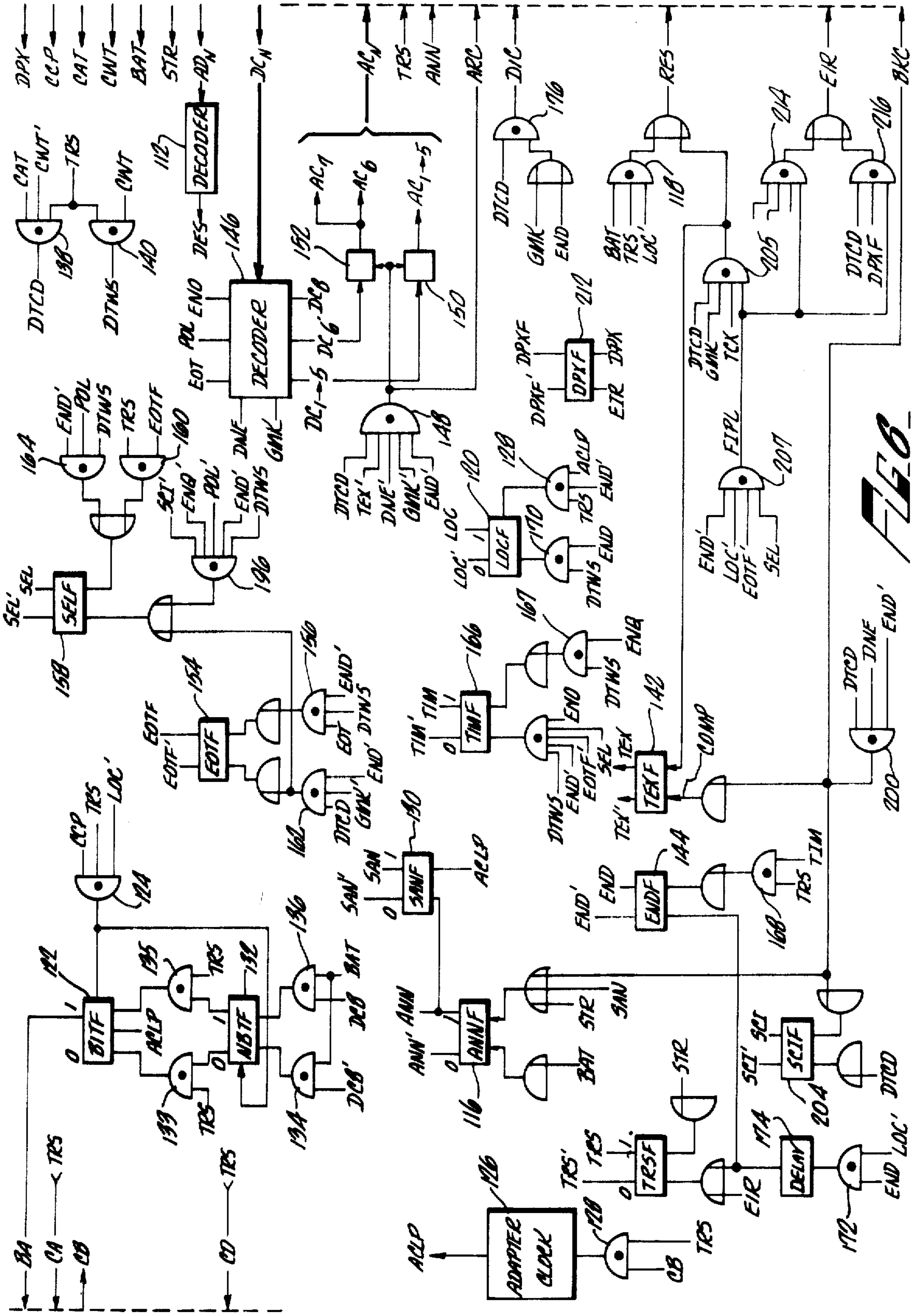
FIG. 6 is a block diagram of the adapter logic in the transmission state.

Referring to FIG. 6, there is shown in block diagram form the operational logic of the line adapter in the transmit state. In the figures, all flip-flops are activated in synchronism with the clock pulses CCP from the DTT unit 14 unless otherwise indicated. AND circuits are indicated as a circular segment with a dot, while OR circuits are shown as segments of a circle with the input lines extending through the segment of the circle. Other logical circuits will be described as they are encountered. Rather than connecting up all the logical elements in each figure, input and output lines of each flip-flop and its control logic are labeled. If followed by an apostrophe or "prime" indication appended thereto, such a line will be "true" whenever the line accompanied by the same label without an apostrophe is "false" and vice versa.

Figure 8:
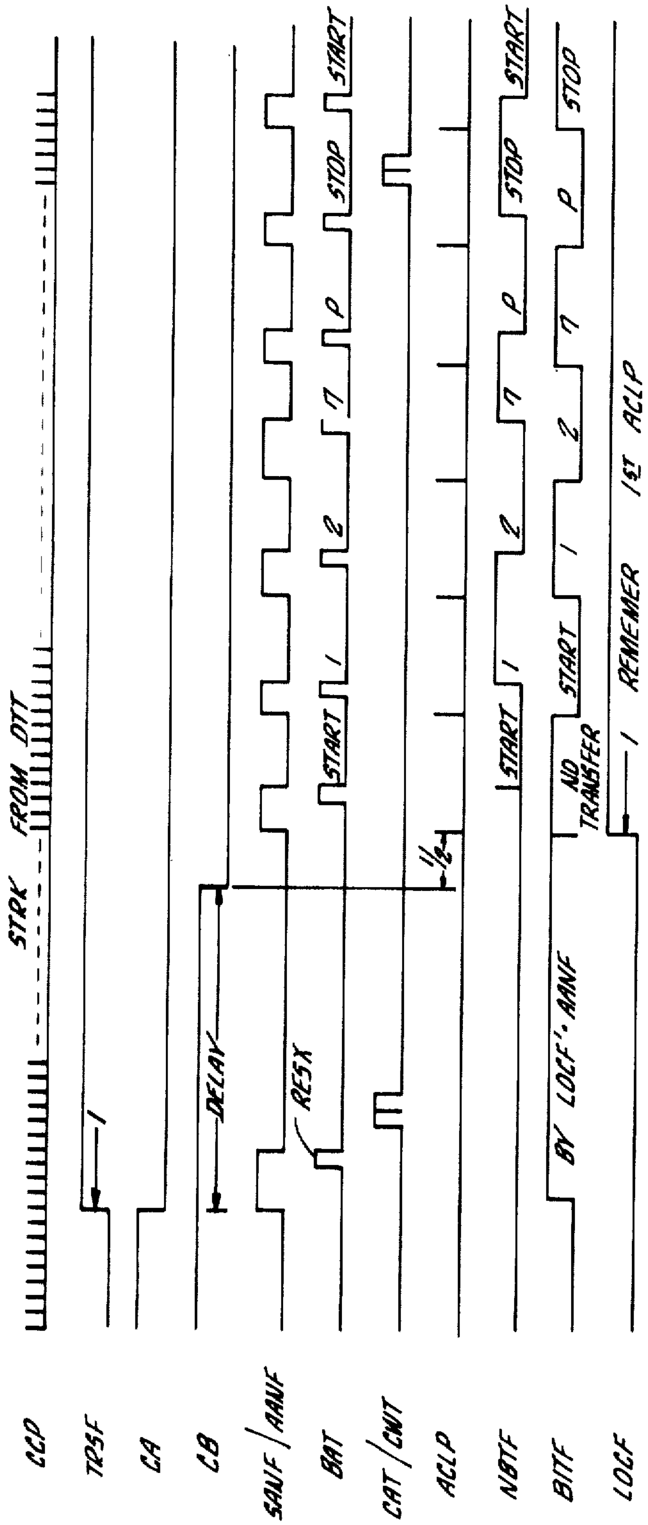
FIGS. 8 through 14 are timing diagrams useful in describing the operation of the adapter.

Referring to FIG. 6, the control logic for the start of transmission by the line adapter is shown in detail. The timing diagram of FIG. 8 is useful in understanding the operation of the adapter in starting transmission of a character to the remote station.

Operation is initiated by the DTT unit 14 which provides a start pulse on the STR line and provides an address on the $AD_n$ lines. A decoder 112 looks at the address and if it corresponds to the particular line adapter, a DES output level is changed from false to true. While not specifically shown, the DES level is applied throughout the control logic of the line adapter to place the line adapter in an operative state.

The STR is applied to a Transmit flip-flop 114 (TRSF) causing the TRS output level of the flip-flop to go true, indicating the adapter is in the transmit state. The TRS output is applied to the CA line (data set interface) to activate the data set. The STR pulse also turns on the Attention-Needed flip-flop 116 (ANNF) providing a true level on the ANN output to the DTT unit 14. This signals an attention-needed condition for the line adapter. With both TRS and ANN lines true, the DTT unit 14 initiates an output operation in the DTT unit in the manner described in detail in the above-identified Pat. 3,390,379. The DTT unit 14 transmits a pulse on the BAT line. The initial BAT pulse occurs before the first character is available in the information register of the DTT unit 14. Therefore, a reset signal is applied to the RES line in response to the initial BAT pulse. This is accomplished by an AND gate 118 to which the BAT pulse is applied together with the TRS level from the transmit flip-flop 114 and a LOC′ level from a LOCF flip-flop 120, which is initially in the zero state. The reset signal on the RES line forces the DTT unit 14 to generate a CAT pulse and CWT pulse.

A BITF flip-flop 122 controls the level on the transmitted data line BA to the data set. When the adapter goes into the transmit state, the BITF flip-flop is set to "1" by the output of an AND circuit 124 when the TRS line goes true and the LOC′ line is true. After some delay, the data set indicates that the communication link is clear to send by providing a true level on the CB line from the data set. This is used to turn on an adapter clock 126 in response to the output of an AND circuit 128 which senses when the TRS line and the CB line are both true. The adapter clock generates clock pulses at the required bit rate of the data set. The adapter clock pulses appear on a line labeled ACLP. These pulses are applied to the BITF flip-flop 122. The first ACLP pulse turns "on" the LOCF flip-flop 120 in response to the output of an AND circuit 128.

The first ACLP turns "on" a SANF flip-flop 130 which in turn causes the ANNF flip-flop 116 to be turned "on" by the next CCP clock pulse. The ANNF flip-flop 116 again signals the DTT unit 14 to initiate an output to the adapter. The next BAT pulse received by the adapter turns "off" the ANNF flip-flop 116. The BAT pulse also signals that the first bit of the character to be transmitted is present on the $DC_8$ line from the information register of the DTT unit 14. This first bit is used to set an NBTF flip-flop 132 to either the "0" or "1" state in response to the output of either an AND circuit 134 or an AND circuit 136. Thus, the binary value of each bit of the character to be transmitted is set in the NBTF flip-flop 132 during the next succession of BAT pulses. The NBTF flip-flop, in turn, controls the BITF flip-flop 122, the latter being set to either "0" or "1" by the next adapter clock pulse ACLP when the adapter is in the transmit state, as controlled by the output of AND circuits 133 and 135. As shown in FIG. 8, successive BAT pulses cause successive bits of the character to be put on the line to the data set including a Start bit, seven information bits, a Parity bit, and a Stop bit.

After the last bit is transferred, the DTT unit 14 puts the next character stored in the buffer into the information register and puts out a CAT pulse. The CAT pulse is divided into two parts, the second part being identified by a CWT pulse. During the first portion of the CAT pulse, the adapter determines what six-bit character is present in the information register of the DTT unit 14 and adds the appropriate seventh bit according to code set shown in FIG. 5 if the adapter is in the control state. The DTT unit at this time adds the Start, Stop, and Parity bits and if the adapter is in the text state, makes the seventh bit opposite to the sixth bit. During the second half of the CAT pulse, i.e., CWT time, the adapter takes appropriate action depending upon what full seven-bit character is now present in the information register 36. An AND circuit 138 senses the CAT pulse, the CWT′ level, and the TRS level. The output of the AND circuit is labeled DTCD and is true only during the first half of the CAT pulse when the line adapter is in the transmit state. An AND circuit 140 senses the CWT pulse during the transmit state, producing an output DTWS only during the second half of the CAT pulse.

With the first six-bit character of the polling message in the information register 36 of the DTT unit 14, it is necessary to convert this to a corresponding seven-bit code character. A text flip-flop 142 (TEXF) determines whether the adapter is in the control state or text state. At the start, the TEXF flip-flop 142 is "off," indicating the control state. An ENDF flip-flop 144 is a control flip-flop indicating whether or not the adapter is in condition to end transmission and at the start is "off."

The $DC_n$ lines from the DTT unit 14 are applied to a decoder 146, which decodes the character and the information register of the buffer memory. If the six-bit character is a ≠ character, the decoder provides a true level on an output labeled DNE; if the character is a Group Mark, the decoder provides a true level on an output labeled GMK. If neither character is present, the character is converted to seven bits. This is accomplished by a logical AND circuit 148 which senses the DTCD level, indicating that it is the first half of the CAT pulse and the buffer is in a transmit state (TRS). The AND circuit 148 also senses that the TEXF flip-flop 142 is in the control state TEX′ and that the ENDF flip-flop 144 has not been turned on, as indicated by line END′. The AND circuit 148 also senses that the character to be transmitted is not a Group Mark, as indicated by the GMK′ level and that the character is not a ≠ character, as indicated by the DNE′ level. Neither of these latter two characters is transmitted to the remote stations but are used to flag the line adapter to change from a control to a text state, or a text to a control state, in the case of the ≠ character, and to terminate transmission in the case of the Group Mark character.

The output of the AND circuit 148 is applied as an ARC signal to the DTT unit 14 to signal that the character is to be replaced. It is also applied to an AND circuit 150 for gating the $DC_1$ through $DC_5$ lines to the $AC_1$ through $AC_5$ lines. Thus, the five least significant bits are restored in the information register 36 in the DTT unit 14. At the same time, the output of the AND circuit 148 is applied to a gate 152 which gates the $DC'_6$ level to both the $AC_6$ and $AC_7$ lines. Thus, the inverse of the $DC_6$ line is applied to the $AC_6$ line, and the $AC_6$ line and $AC_7$ lines are made equal. This corresponds to the mapping change indicated by FIG. 5 in which a six-bit character from columns 4 and 5 is changed to a seven-bit character of columns 6 and 7, and a six-bit character of columns 2 and 3 is changed to a seven-bit character of columns 0 and 1 when the adapter is in the control state. The Start, Stop, and Parity bits are added to the characters by the DTT unit 14 so that the full character is ready to send out on the telephone lines by the data set.

Figure 9:
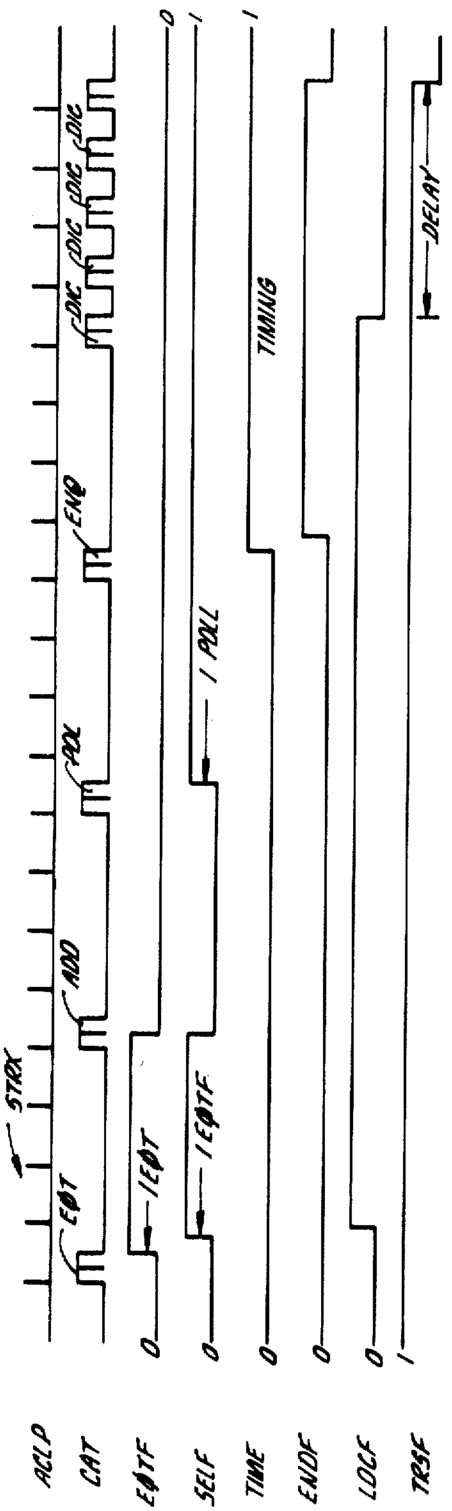

Assuming that a polling message is to be transmitted, the full character to be transmitted at this time is EOT. The waveforms of FIG. 9 show the operation of the adapter logic element during transmission of the polling message. During the second half of the CAT time, an EOT line from the decoder 146 is true and the DTWS level goes true. During this time, a control flip-flop 154 (EOTF) is turned "on" by the output of an AND circuit 156, which senses the DTWS time, that the ENDF flip-flop 144 is "off," and that the EOT output of the decoder 146 is true, indicating that the EOT character is present. When the EOTF flip-flop 154 is "on," it turns on a control flip-flop 158 (SELF) in response to the output of an AND circuit 160 which senses that the EOTF level is true and that the TRS level is true, indicating that the adapter is in the transmit mode. The ten bits of the EOT character are now transmitted during successive BAT pulses. The DTT unit then loads the next character in the information register and generates the next CAT pulse. This is normally the first address character of the polling message. At the start of CAT time, the EOTF flip-flop 154 and SELF flip-flop 158 are turned "off" by the output of an AND circuit 162 to which the DTCD level is applied, indicating the first half of the CAT pulse, the GMK′ line from the decoder 146, indicating that the character is not a Group Mark, and the END′ line, indicating that the ENDF flip-flop 144 is "off." Otherwise operation is identical to that described above.

When the POL character is encountered after the second address character has been transmitted, the SELF flip-flop 158 is turned "on" by the output of an AND circuit 164, which senses the DTWS level during the second half of CAT time, the POL level from the decoder 146, indicating that a POL character is present, and the END′ level, indicating that the ENDF flip-flop 144 is "off." The SELF flip-flop 158 being "on" together with the EOTF fl'p-flop 154 being "off" indicates to the line adapter that it is now in the poll state. The POL character is then transmitted in the normal manner and the next character in the poll message is examined during the next CWT time. This should be the ENQ character which signals an inquiry to the remote terminal.

During CWT time for the ENQ character, a timing flip-flop 166 (TIMF) is turned "on" by the output of AND circuit 167 in response to the ENQ level derived from the decoder 146, together wtih the DTWS signal. This, in turn, puts the ENDF flip-flop 144 in the "1" state in response to the output of an AND circuit 168 to which the TRS level and the TIM level are applied. The ENQ character is transmitted in the manner described above.

At the next CAT time, the LOCF flip-flop 120 is turned "off" by the output of an AND circuit 170 to which the DTWS level, signifying the second half of the CAT time, and the END level, indicating that the ENDF flip-flop 144 is turned "on," are applied. The TRSF flip-flop 114 is then turned "off" to put the adapter in the receive state. This is accomplished by the output of an AND circuit 172 that senses that the ENDF flip-flop 144 is "on" and that the LOCF flip-flop 120 is "off". A delay, indicated by the delay circuit 174, is provided between the AND circuit 172 and the TRSF flip-flop 114. This delay is normally of the order of four adapter clock pulse periods and is provided to permit the data set to complete transmission of the ENQ character. The output of the delay circuit 174 also resets the ENDF flip-flop 144. When TRSF 114 is turned off, the adapter clock is stopped. Since no characters are to be transmitted following the ENQ character, a discard signal DIC is sent to the DTT unit 14 at each subsequent CAT time. This is generated by the output of an AND circuit 176 to which the DTCD level is applied during CAT time and to which the END level is applied. The DIC level prevents the generation of BAT pulses, but rather a CAT pulse is generated at the next adapter clock time in response to the attention-needed signal ANN. Thus, no further characters are transmitted during the delay period unti lthe TRSF flip-flop is turned "off."

Figure 7:
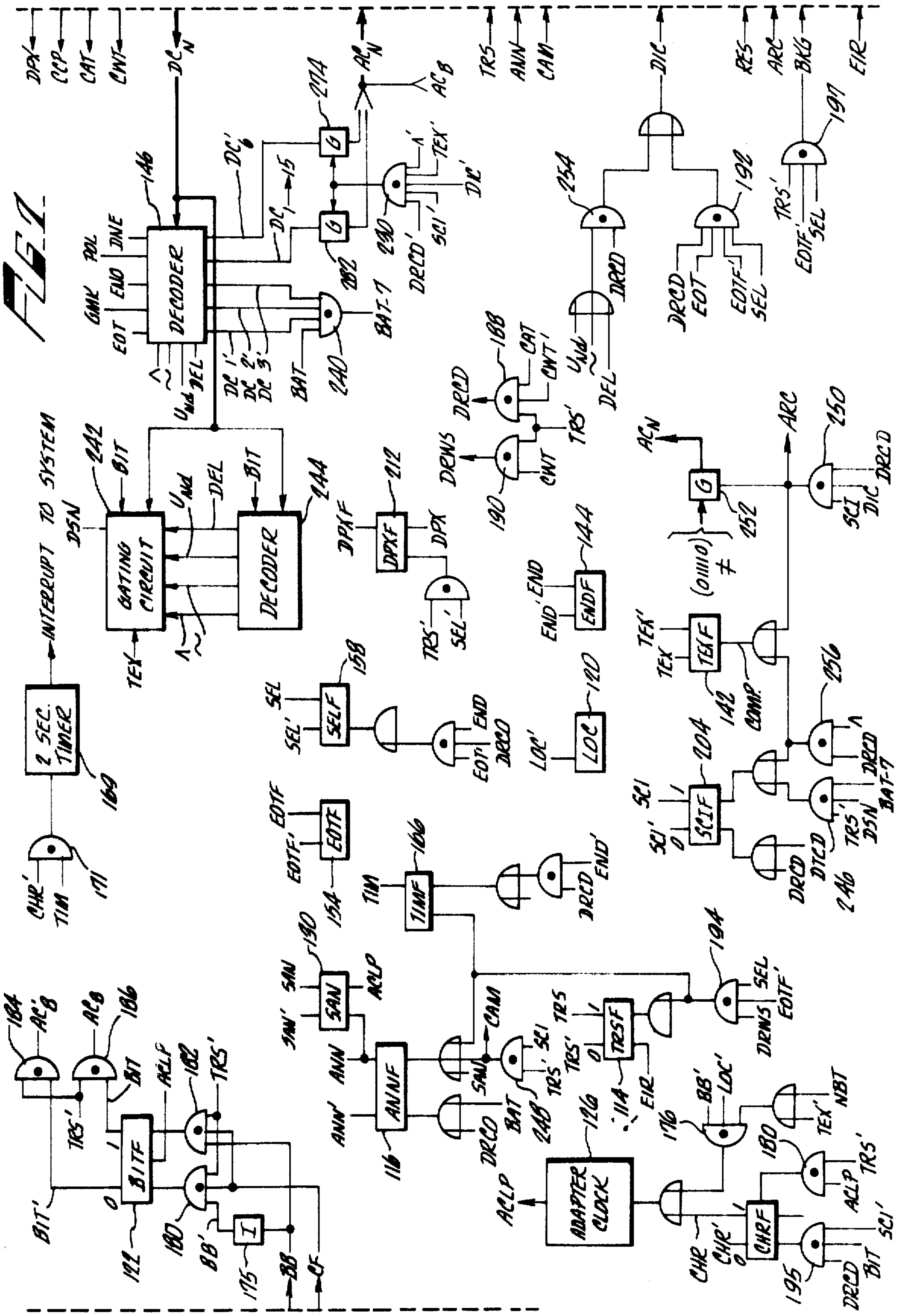
FIG. 7 is a block diagram of the adapter logic in the receive state.
Figure 10:
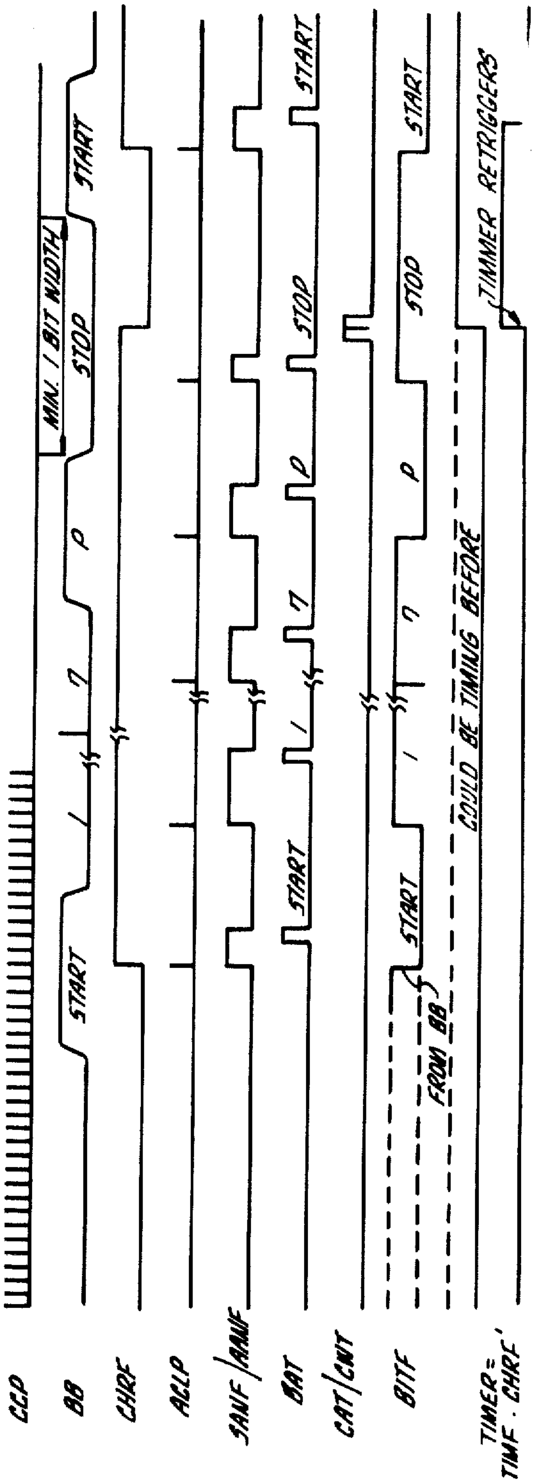

This completes the transmission of the poll message to the remote station and the adapter returns to the receive state. However, the adapter remains in the poll state in which the SELF flip-flop 158 is "on." The line adapter now awaits for a response from the remote station. The adapter logic for the receive state operation is shown in FIG. 7. The waveforms of FIG. 10 show the operation of the adapter during the receive state. It should be noted with TIM true, a two-second timing circuit 169 is turned "on" by the output of an AND circuit 171. The AND circuit also senses that the CHRF flip-flop 178 is "off." The latter flip-flop is turned "on" when a character is being received, so that the timing circuit 169 is turned "off" if a character is received within two seconds. Otherwise the circuit 169 times out, producing an Interrupt signal.

The response from the remote station may be an EOT character, indicating a negative poll response, or it may be a message. In either case, with the data set turned on, the BB line and the CF line from the data set are true. When a Start pulse at the beginning of a character is received on the line by the data set, the BB line goes false and the BB′ line, provided by an inverter 175, is true. This turns on the adapter clock 126 through an AND circuit 176 which senses that the BB′ line is true, the LOC′ line from the LOCF flip-flop is true, and that the TEX′ line from the TEXF flip-flop is true. This starts the adapter pulses ACLP after a delay interval of a half pulse time. The first adapter clock ACLP turns on a CHRF flip-flop 178 in response to the output of an AND circuit 180 which senses that the adapter is in the receive state as indicated by the TRS′ line.

The BITF flip-flop 122 is controlled by the information levels on the BB line from the data set during successive adapter clock pulses. The BB′ line and the BB line are applied respectively to AND circuits 180 and 182 together with the CF line, indicating the presence of a carrier, and the TRS′ line, indicating the receive state of the adapter. The output of the AND circuit 180 sets the BITF flip-flop 122 to the "0" state while the output of the AND circuit 182 sets it to the "1" state. The bits stored in the BITF flip-flop 122 are transferred to the DTT unit over the $AC_8$ lines through AND circuits 184 and 186, which sense that the adapter is in the receive state. The DTT unit 14 is alerted to receive data by the TRS line, which is false, indicating that the adapter is in the receive state, and by the attention-needed signal on the ANN line. The ANN line is turned "on" by each adapter clock pulse and turned "off" by each BAT signal received back from the DTT unit 144, in the manner already described above.

After all of the bits of the first character are received, the DTT unit 14 generates a CAT pulse and a CWT pulse. An AND circuit 188 senses the CAT pulse and the CWT′ condition and the TRS′ condition, producing a DRCD output when the adapter is in the receive state and during the first half of the CAT pulse. An AND circuit 190 senses the TRS′ condititon and the CWT pulse, producing a DRWS pulse on the output during the second half of the CAT pulse.

Figure 11:
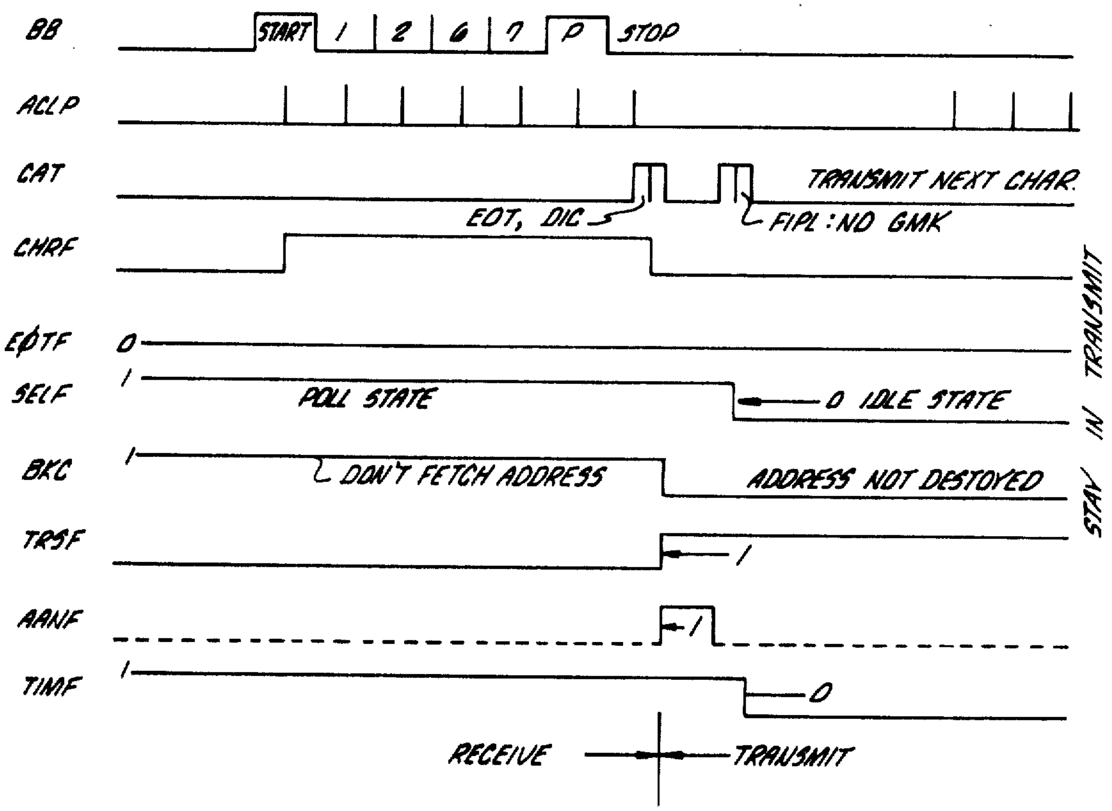

During CAT time, the adapter responds to the full character now stored in the information register and applied to the decoder 146 over the $DC_n$ lines. The resulting operation is shown by the waveforms of FIG. 11. The EOT character, if present at this CAT time, indicates a negative poll response, which must be discarded and the adapter returned to the transmit state for transmitting the next poll message. A discard signal DIC is produced by the output of an AND circuit 192 which senses that the EOT character is present by the EOT line from the decoder 146 and that the adapter is in the poll state as determined by the EOTF′ line and the SELF line. The transmit flip-flop 114 is then turned on by the output of an AND circuit 194 to which the DRWS signal is applied and also poll state signals EOTF′ and SELF. The output of the AND circuit 194 also turns on the ANNF flip-flop 116, signaling attention-needed to the DTT unit 14. This restarts the transmit operation described above in connection with FIGS. 6 and 8. The CHRF flip-flop 178 is turned "off" at DRCD time by the output of an AND circuit 195 which senses that BIT is true, indicating the end of the character, and SCI′ is true, indicating that no mode change from text to control state or control to text state is present.

When the adapter is in the receive state and in the polling state, as sensed by an AND circuit 197, it sends a back-space signal BKC to the DTT 14. The DTT unit 14 at CAT′ time and with BKC true, causes the X, Y, and Z registers to be reset to the initial information storage address of the buffer, excluding the address storage location and the input-output storage location for the buffer. As a result, the first character received from the remote station, if it is not a negative response EOT, is stored in the start of the data storage portion of the buffer. However, in the event an EOT character is received and recognized during CAT time by the decoder 146, the discard signal on the DIC line at the output of the AND circuit 192 prevents the address in the X, Y, and Z registers from being stored in the address buffer at memory column 00. See the description in the above-identified Pat. 3,390,379. Therefore, the address of the start of the next polling message in the address column 00 of the buffer is still available when the adapter returns to the transmit state.

With the next CAT pulse from the DTT unit 14, the next character in the buffer is placed in the information register and made available to the adapter over the DC lines. This normally would be an EOT character forming the start of the next polling message stored in the buffer. However, the character may not be an EOT but a Group Mark, as pointed out in connection with the operation flow diagram of FIG. 4, signaling that the last polling message in the buffer has been sent. The Group Mark must be examined to determine whether it is a text Group Mark or control Group Mark. If it is a text Group Mark, the buffer address is reset back to the initial address and the polling is repeated. Otherwise, the adapter returns to idle and the system is alerted by an Interrupt.

Considering first the condition where the first character in the poll is not a Group Mark and referring to FIG. 6 and the waveforms of FIG. 11, the SELF flip-flop 158 is turned "off" during DTWS time by the output of an AND circuit 196 which senses that the ENDF flip-flop 144 is "off" and that the character sensed by the decoder 146 is not a POL or an ENQ. This returns the adapter to the idle state. Also the TIMF flip-flop 166 is turned "off" during DTWS time by the output of an AND circuit 198 which senses that the adapter is in the poll state as indicated by the EOTF′ and SEL lines, that the character is not ENQ and the ENDF flip-flop 144 is "off." Operation of the polling message now continues with the sending of the address characters, the POL character, and the ENQ character in the manner described above.

The polling continues on successive polling messages in this manner until either a positive response to a poll is received or the last polling message in the buffer is transmitted. The last polling message is followed by a Group Mark in the control state or followed by a Not-Equal ($\neq$) character and a Group Mark to indicate a text state. The $\neq$ character, when encountered in the buffer during transmission, signals the adapter to change states.

Figure 12:
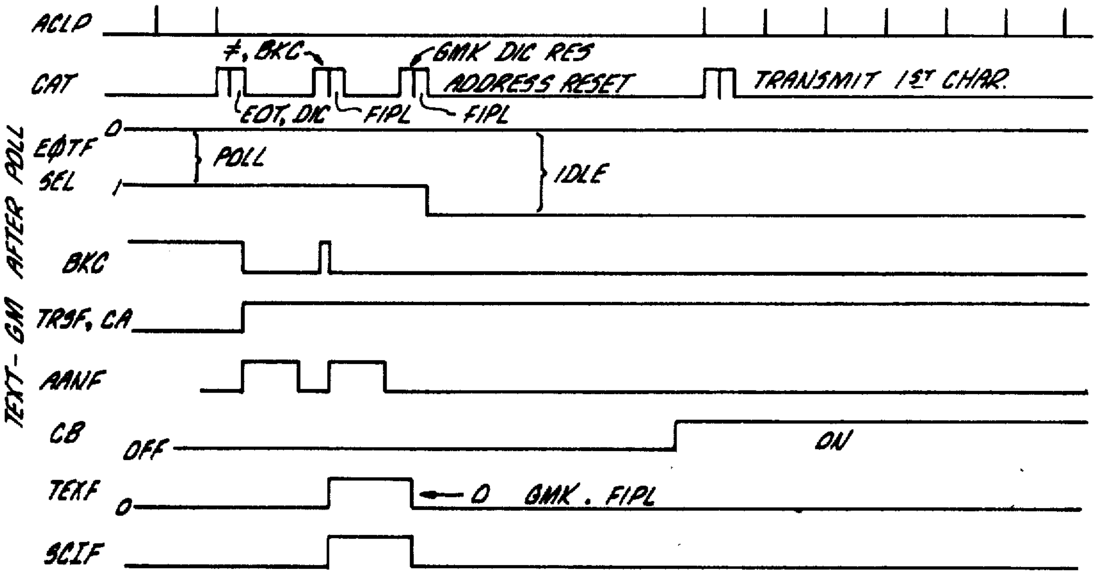

Operation of the adapter in the poll state when a text Group Mark is encountered is shown by the waveforms of FIG. 12. The six-bit $\neq$ character (011110), when in the information register of the DTT unit 14, activates the DNE line at the output of the decoder 146. See FIG. 6. The DNE level is used to complement the TEXF flip-flop 142 by means of an AND circuit 200 to which is applied the DTCD signal indicating that it is CAT time, the END′ level indicating that it is not a message-ending condition, and the DNE line. Since the TEXF flip-flop 142 is normally in the control state during the polling operation, a $\neq$ character at this time causes the flip-flop 142 to be complemented to the TEX state. At the same time, a control flip-flop 204, labeled SCIF, is turned "on" by the output of the AND circuit 200. The SCIF flip-flop 204 signals a mode change in the adapter. The output of the AND circuit 200 also turns "on" the ANNF flip-flop 116 to signal attention-needed.

The output of the AND circuit 200 is also applied to the BKC line to the DTT unit 14. This level, during the transmit state, operates the same in the DTT unit 14 during CAT time as the discard signal DIC except that the address is permitted to increment so that the address now points to the next character location in the buffer, rather than pointing at the same character address, as in the case of the DIC discard. As a result, at the next CAT time of the DTT unit 14, the next character, which under the case in consideration is a Group Mark, is placed in the information register, producing a signal on the GMK line from the decoder 146 in the adapter. The SCIF flip-flop 204 is turned "off" by the DTCD, permitting the SELF flip-flop to be turned "off" by the output of AND circuit 196 at DTWS time. Also at DTCD time, the DIC line to the DTT unit 14 is made true by the output of AND circuit 176. The DTT unit 14 is also reset by the RES line to which the output of an AND circuit 205 is connected. The AND circuit 205 senses DTCD time, the GMK condition, the TEX or text state condition, and the first poll character condition FIPL from an AND circuit 207. The latter senses the poll state, EOTF′ and SEL, and the END′ and LOC′ are true. The output of the AND circut 205 also resets the TEXF flip-flop 142 to the "off" or control state condition. The DTT unit 14 and the adapter are now in condition to repeat the polling process starting with the first polling message in the buffer.

Figure 13:
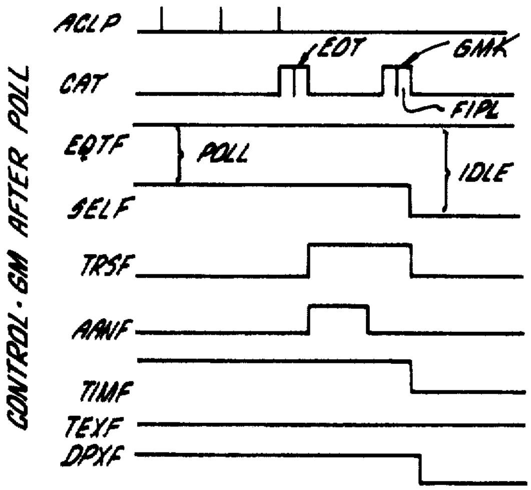

If the Group Mark is encountered in the control state, the polling operation is discontinued and an Interrupt is sent to the system. This operation is shown by the waveforms of FIG. 13. The same result can be initiated by the processor via an Interrogate signal on a DPX line to the adapter. A signal on a DPX line to the adapter turns on a DPXF flip-flop 212, signaling that the next negative poll response should stop the automatic polling operation.

Assuming the first character following the EOT poll response is the Group Mark, the adapter is still in the control state with the TEXF flip-flop 142 turned "off." The output of the AND circuit 207, designated FIPL, indicates at this time that it is the first character of the poll. FIPL is applied to an AND circuit 214 together with the group GMK line from the decoder 146 and the TEX′ line, indicating that the adapter is in the control state, and the DTCD line, indicating that it is CAT time. The output of the AND circuit 214 provides a signal, designated EIR, to the DTT unit 14, signaling that an end of input is recognized. This returns the DTT unit 14 to the system, in the manner described in the above-identified patent. The SELF flip-flop 158 is reset to the "0" state, returning the adapter to the idle condition by the output of the AND circuit 196. The TRSF flip-flop 114 is reset to place the adapter in the receive state by the EIR signal.

The polling operation can also be terminated by an interrogation from the processor which causes the DTT unit 14 to provide an output level on a DPX line. This sets a DPXF flip-flop 212 in the designated adapter. An AND circuit 216 senses the DPXF state of the flip-flop 212 and the DTCD pulse at CAT time and also the output FIPL of the AND circuit 207, indicating that it is the first character in the poll. The AND circuit 216 also produces a signal on the EIR line to the DTT unit 14. This terminates the polling operation, returning the buffer to the system and placing the adapter in the receive state and in the idle state. This completes the automatic polling description.

If a positive poll response is received from the remote station in response to a polling message, the first character received from the remote station would not be an EOT but normally would be either an SOH character, indicating the start of a heading, or an STX character, indicating the start of a text message. Since these are both control characters, after they are stored in the information register of the DTT unit 14, they are examined by the adapter at CAT time and modified for storage in the buffer memory as a six-bit character. This requires that the sixth bit be complemented and the seventh bit be deleted. Referring again to FIG. 7, this is accomplished by the output of an AND circuit 230 to which is applied the DRCD pulse at the start of CAT time, the SCI′ state from the SCIF flip-flop 204 indicating that there has been no mode change by the TEXF flip-flop 142, the DIC′ level indicating that no discard signal is being sent to the DTT unit 14 in response to the presence of a Tilde (~), Underline (—), or Delete (DEL) character, the TEX′ level indicating that the adapter is in the control state, and the Λ′ level from the decoder 146 indicating that the character is not a Circumflex (Λ) character. The output of the AND circuit 230 is applied to gates 232 and 234. Gate 232 gates the $DC_{1-5}$ lines to the $AC_{1-5}$ lines while the gate 234 gates the $DC_6'$ to the $AC_6$. The output of the AND circuit 230 also provides an ARC signal, signaling the DTT unit 14 that the adapter is replacing the character in the information register.

Figure 14:
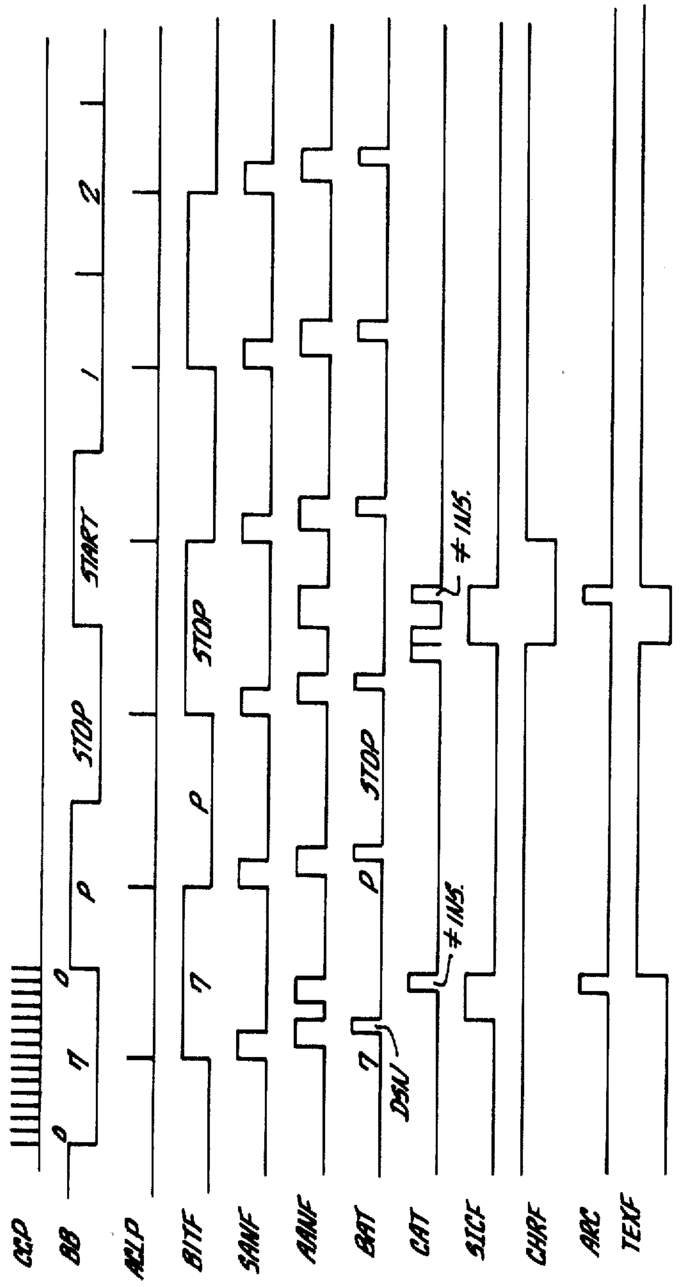

The next character received after an SOH or STX control character normally would be a text character requiring a mode change in the adapter and the insertion of a ≠ character in the buffer memory to flag the system that a mode change has taken place and that the next character is a text character. Again referring to FIG. 7 and in connection with the timing diagram of FIG. 14, when the seventh bit of the received character is in the BITF flip-flop 122 and the first six bits of the received character are stored in the information register of the DTT unit 14, an AND circuit 240 senses that the seventh BAT is received by the adapter by sensing that the $DC_1'$ line is true, the $DC_2'$ line is true, and that the $DC_3$ line is true. At the same time, a gating circuit 242 looks at the condition of the TEXF flip-flop 142 to determine if the adapter is in the control or text state and it looks at the bit stored in the BITF flip-flop 122. The gating circuit 242 also looks at the output of a decoder 244 which senses whether or not the first six bits stored in the information register of the DTT unit 14 together with the seventh bit in the BITF flip-flop 122 form the seven-bit code combinations corresponding to the Circumflex (Λ) character, the Tilde (~) character, the Underline (—) character, or the Delete (DEL) character. If none of these four characters is present and if a text character is present when the adapter is in the control state, or a control character is present when the adapter is in the text state, as indicated by the TEXF flip-flop 142, the output of the gating circuit, designated DSN, is true, indicating that a mode change must take place.

The output of the gating circuit 242 is used to turn on the SCIF flip-flop 204. This is accomplished by the output of an AND circuit 246 which senses that BAT–7 is true, that the DSN line is true, and that the TRS′ line is true. This causes the attention-needed flip-flop 116 to be turned "on" by the output of an AND circuit 248 to which the TRS′ line is applied and the SCI line is applied, indicating that the flip-flop 204 has been turned "on." The output of the AND circuit 248 also applies a signal to the CAM line going to the DTT unit 14, indicating a character access operation. This results in a CAT signal being sent back by the DTT unit 14, producing a DRCD signal in the adapter.

A ≠ character (011110) is now applied to the AC lines going to the DT unit 14. This is accomplished by an AND circuit 250 which senses that the SCI condition is true, that the DIC′ condition is true, indicating that no character discard is in order, and that the DRCD pulse is present at CAT time. The output of the AND circuit 250 is applied to a gate 252 for gating the ≠ character to the $AC_n$ lines. The output of the AND circuit 250 also applies to the signal of the ARC line, indicating a character replacement operation in the DTT unit 14. The output of the AND circuit 250 is also used to complement the TEXF flip-flop 142. The SCIF flip-flop 204 is turned "off" by the DRCD pulse. In this manner, the adapter is changed from the control mode to the text mode and a ≠ character is inserted in the buffer memory to flag the mode change to the system. After the ≠ character is stored in the buffer at the next address location by the ARC signal, the remaining Parity bit and Stop bit of the character being received are added to the character in the I/O section of the buffer in the normal manner. A CAT signal is then produced by the DTT unit 14, and unless the character is a Tilde, Underline, Delete or Circumflex character, it is stored in the next location in the buffer memory.

If the character received is a Tilde, an Underline, or a Delete character, it cannot be transmitted or received and so is discarded if received and the TEXF flip-flop 142 is not complemented. To this end, an AND circuit 254 at DRCD time senses whether either the Tilde, Underline, or Delete characters are present at the output of the decoder 146 and provides a signal on the DIC line to the DTT unit 14. This also inhibits the output of the AND circuit 250, preventing the TEXF flip-flop 142 from being complemented and preventing any mode change from taking place in the adapter.

If a Circumflex (Λ) character has been received, the ≠ character is not inserted at BAT–7 time and no mode change takes place. After receipt of the Parity bit and the Stop bit has been completed in the normal manner, a ≠ character is inserted in the buffer memory. This is accomplished by the normal storing of the six bits of the Circumflex character which are the same as the ≠ character in the six-bit code. The output of the AND circuit 230 is false so that the sixth bit is not complemented. Also at the same CAT time, an AND circuit 256 senses that the Circumflex (Λ) character is present as determined by the decoder 146, turning "on" the SCIF flip-flop 204 in response to the DRCD pulse, again indicating a mode change and complementing the TEXF flip-flop 142. Turning "on" the SCIF flip-flop 204 causes a second ≠ character to be inserted in the buffer. As a result the TEXF flip-flop 142 is complemented a second time, with the net result that no mode change takes place within the adapter, and the adapter is ready to receive the next character. In this manner, the Circumflex character is stored in the buffer memory as a pair of ≠ characters with no mode change taking place.

During transmission, as pointed out above, a ≠ charater in the buffer normally flags a mode change between the text and control states. The ≠ character is discarded and the next character is sent. If the next character is also a ≠ character, a Circumflex character is transmitted to the remote station. Since SCIF flip-flop is "on" when the second ≠ character is encountered at the next CAT time, the BKC line is not set and the ≠ character is transmitted and not discarded. The TEXF flip-flop is again complemented so that there is no net mode change of the adapter. The six-bit ≠ character is now transmitted as a seven-bit Circumflex character by the adapter in the normal manner.

From the above description, it will be appreciated that a nonsynchronous adapter is provided which permits continuous polling of a number of remote stations without any system interrupt to the processor for generating polling messages. A number of polling messages are loaded into the buffer at one time by the processor, giving the system flexibility and determining which remote stations will be polled and at what frequency they will be polled. For example, the polling messages can be arranged in any manner desired so that one remote station can be polled much more frequently than another remote station. The adapter permits use of substantially the full ASCII code, permitting use of upper- and lower-case machines at the remote stations. The present adapter provides the correct mapping capability for use with the Burroughs 5500 computer systems. While the Tilde, Underline, and Delete characters cannot be transmitted or received, the Circumflex character can be transmitted or received by translating the seven-bit character to two six-bit characters in the code conversion.

What is claimed is:

1. In a data transmission system in which an addressable buffer memory transmits data to and receives data from a plurality of remote stations over a communication line through a common line adapter circuit, apparatus for continuously polling the remote stations in any predetermined order and frequency, comprising means in the adapter coupling the buffer memory to the communication line for transferring characters between the buffer memory and communication line, means in the adapter initating transfer by said transferring means of a sequence of characters from the buffer memory to the remote stations starting with a first predetermined address location, said sequence of characters including a plurality of polling messages, each message having characters identifying the address of a particular remote station, signaling a polling operation to the remote stations, and identifying the end of each polling message, first decoding means in the adapter coupled to the transferring means for decoding each character as it is transferred to the communication line, said first decoding means signaling when the end of the polling message character is transferred out of memory, means responsive to the signal from said first decoding means for interrupting transfer of characters from the buffer memory to the communication line by said transferring means, means coupled to the communication line for receiving coded characters from the remote stations, and second decoding means in the adapter coupled to the output of said receiving means and responsive to a predetermined character from a remote station signaling that the remote station has no message for reactivating said transferring means to initiate transfer of the next characters in said sequence from the buffer memory to the remote station.

2. Apparatus as defined in claim 1, further including means in the adapter coupled to the output of the receiving means and responsive to message characters received from any polled remote station for loading said message characters into the buffer memory starting with said first predetermined address location in memory.

3. Apparatus as defined in claim 1, further including means in the adapter coupled to said transferring means and responsive to first predetermined control characters when encountered in said sequence for inhibiting the transmission of said first control characters and resetting said transmitting means to said first predetermined address, whereby transfer of said sequence of characters is repeated.

4. Apparatus as defined in claim 1, further including means in the adapter coupled to said transferring means and responsive to second predetermined control characters when encountered in said sequence for inhibiting the transmission of said second control characters and halting further transfer of said sequence of characters from the buffer memory.

5. Apparatus for transmitting digital data to and receiving digital data from a plurality of remote stations over a common communication line, comprising an addressable memory having a plurality of polling messages stored therein at predetermined address locations, each polling message including coded characters identifying a particular remote station and signaling a request for data transfer, means connected to the memory for reading out said polling message characters in sequence from said predetermined address locations starting with an initial address, means coupled to the output of the memory for transmitting the identifying characters and the data request characters read out of memory to the remote stations, said transmitting means including decoding means responsive to the last character in each polling message for interrupting said readout means and waiting for a reponse, means coupled to the communication line for receiving characters on the line from the remote stations, means coupled to the output of said receiving means for decoding any received characters, and connected to said decoding means responsive to predetermined characters when received from a remote station for reactivating said readout means, whereby the next polling message in address sequence is transmitted to the remote stations, means coupled to the memory readout means and responsive to a predetermined character read out of memory for inhibiting transmission of said character and resetting said memory readout means to the initial address, whereby the reading out of said polling messages is repeated.

6. Apparatus as defined in claim 5, further including means coupled to the receiving means for storing characters received from a remote station in the buffer memory, said reactivating means responsive to said predetermined characters inhibiting said character storing means when said predetermined characters are received from the remote stations.

7. Apparatus as defined in claim 6, wherein said storing means includes means for storing the received characters in sequence in the buffer memory in said predetermined address locations starting with the initial address, whereby the received message from the remote station replaces the polling messages in the memory.

8. Apparatus as defined in claim 5, further including means responsive to the decoding means when a particular character is encountered for indicating that the said character has been read out of memory and inhibiting the transmission of said character to the remote station, and means responsive to the decoding means when said particular character is again encountered as the next character in sequence read out of memory and the indicating means has been previously set by encountering the first one of said characters for transmitting a single character to the remote station.

9. Apparatus as defined in claim 6, further including means responsive to a particular character when received from a remote station for storing a character in two successive address locations in the buffer memory.

References Cited

UNITED STATES PATENTS

| | | | |
|---|---|---|---|
| 3,390,379 | 6/1968 | Carlson et al. | 340—172.5 |
| 3,407,387 | 10/1968 | Looschen et al. | 340—152 |
| 3,427,590 | 2/1969 | Mauzey et al. | 340—147 |

RAULFE B. ZACH, Primary Examiner